Sept. 26, 1961 E. E. FOSTER 3,001,440
FILM MAGAZINE
Filed Feb. 18, 1957 2 Sheets-Sheet 1
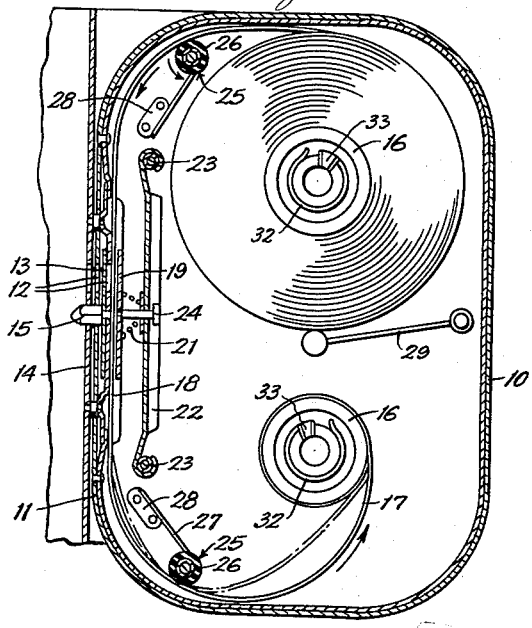
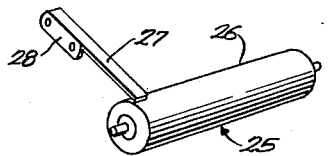
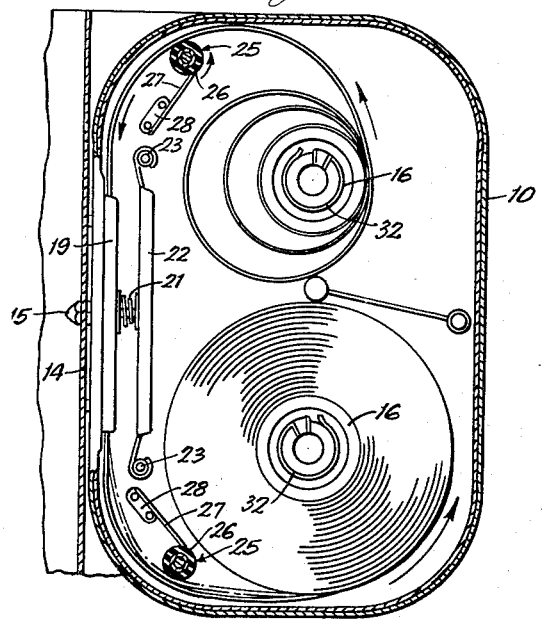
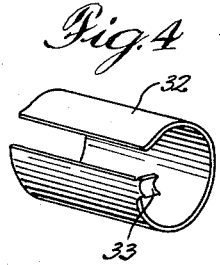
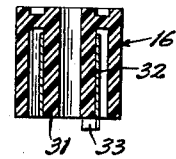
INVENTOR:
Edwin E. Foster,
BY Bair, Freeman & Molinare
ATTORNEYS.

Sept. 26, 1961

E. E. FOSTER 3,001,440

FILM MAGAZINE

Filed Feb. 18, 1957

INVENTOR:
Edwin E. Foster,
BY Bair, Freeman & Molinare
ATTORNEYS.

3,001,440
FILM MAGAZINE
Edwin E. Foster, % Majik-Ironers Inc., 402 Capital
National Bank Bldg., Austin, Tex.
Filed Feb. 18, 1957, Ser. No. 640,877
5 Claims. (Cl. 88—17)

This invention relates to film magazines and more particularly to reversible film magazines for motion picture cameras and the like.

In magazine type motion picture cameras it has been the usual practice to utilize a relatively heavy spring on the pressure pad which engages the film to produce a high friction drag on the film so that the take-up spool in the magazine will not pull the film out of position. This is necessary because the parts conventionally utilized in spool type cameras to hold the film against unintended movement by the take-up spool are eliminated to conserve space, and because the direction of travel of the film in the magazine must be reversible. Thus, with magazine type cameras a more powerful spring motor must be used on the camera to drive the pulling finger which advances the film, than on spool cameras, so that a large spring is required to drive the film through the camera.

It is one of the objects of the present invention to provide a film magazine for motion picture cameras and the like, in which minimum drag is required on the film and the film is held against unintentional movement by the take-up spool without increasing the size of the magazine.

Still another object is to provide a film magazine in which the film is held against advancement by the take-up spool when it is drawn taut, and is wound on the take-up spool only when slack is presented between the pulling finger and the take-up spool.

According to a feature of the invention, the film passes over a friction roller between the film guiding means and the take-up spool, and means are provided to prevent rotation of the roller by the film in a direction toward the adjacent take-up spool while permitting free rotation in the opposite direction. In the preferred construction the rollers have yielding surfaces to engage the film and spring fingers are provided engaging the roller surfaces to grip them against rotation in one direction and to permit rotation in the opposite direction.

A further object of the invention is to provide a film magazine in which the spools are driven through slipping drive means constructed to produce a substantially constant driving torque on the spools without depending on the usual slipping clutch provided in the camera itself.

The above and other objects and features of the invention will be more readily apparent from the following description when read in connection with the accompanying drawings, in which:

FIGURE 1 is a section through a film magazine embodying the invention;

FIGURE 2 is a section similar to FIGURE 1 showing the film wound in the opposite direction;

FIGURE 3 is a partial perspective view showing one of the friction rollers and the control spring therefor;

FIGURE 4 is a perspective view of a driving clutch spring;

FIGURE 5 is a section through one of the spools with the driving clutch spring assembled thereon;

Figure 6:
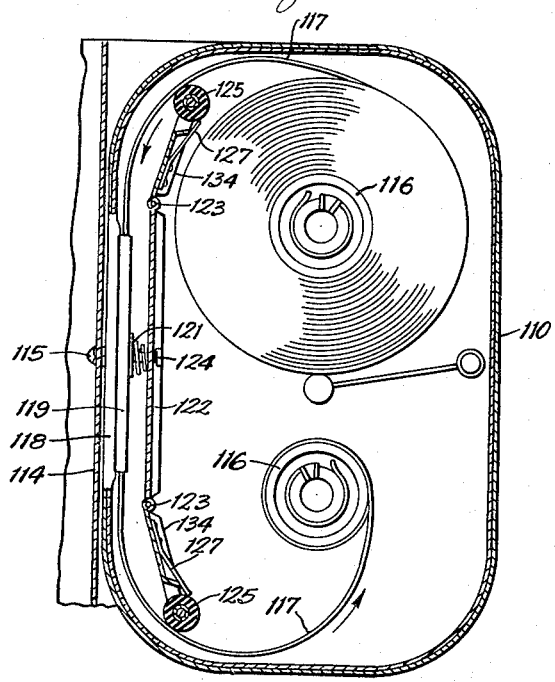
FIGURE 6 is a view similar to FIGURE 2 of an alternative construction.

The magazine as shown in FIGURES 1 to 5 comprises a generally rectangular casing 10 having flat ends and formed of metal or similar material. One side wall of the magazine, such as the side wall 11, is formed with openings 12 adapted to be selectively uncovered by a movable vane member 13 when the magazine is mounted in a camera, so that one side or the other of the film may be exposed through the usual camera shutter mechanism. In the construction as shown, the camera includes a plate 14 formed with an aperture therein to receive a square projection 15 rotatably carried by the magazine wall 11 and connected to the shutter 13 to control it. When the magazine is mounted in the camera, the projection 15 will enter the opening in the wall and will move the shutter to open the correct one of the exposure apertures 12. This mechanism per se forms no part of the present invention and may take the form of any one of the several conventional constructions commonly employed.

A pair of spools 16 are rotatably mounted in the magazine adjacent to the opposite ends thereof to carry a film 17. The film may pass from one of the spools to the other through film guiding means, which includes as shown a film guide plate 18 secured to the wall 11 of the magazine and provided with suitable flanges for guiding the film accurately past the exposure apertures.

The film is held against the guiding plate 18 by a pressure pad 19 which is urged toward the guiding plate by a spring 21. The spring 21 seats against a supporting plate 22 which is rigidly mounted in the magazine by having its ends fitted over fixed pins 23 in the magazine. The pressure pad is supported and guided by a pin 24 extending slidably through the support 22, and the spring 21 engages the support and urges the pressure pad toward the film guide 18.

In passing from the spools through the film guiding means, the film 17 passes over rollers 25 which are rotatably supported in the magazine between each of the spools and the film guiding means. The rollers as shown are rotatably mounted on pins in the casing and are preferably in the form of sleeves of metal or the like, having a yielding covering 26 thereon formed of a relatively soft rubber or rubber like material.

Each of the rollers is permitted to turn freely in response to movement of the film therepast when the film is traveling in a direction from the adjacent spool toward the film guiding means, and is prevented from rotation by the film in a direction toward the adjacent spool. For this purpose a spring finger 27 is mounted in the magazine and has its free end resiliently engaging the yielding surface of the adjacent roller, so that the end of the spring will grip the surface and prevent the roller from turning in one direction, and will slide over the surface when the roller turns in the opposite direction.

As shown in FIGURES 1 to 5, the spring is formed with a flange 28 adjacent to one end, which is riveted or otherwise permanently secured to one end of the magazine. The film on the spools may be guided, and held tightly on the spool against tangling by a movable arm 29 pivotally mounted in the magazine with its free end riding against the film between the two spools.

In the use of the unit, when the film is traveling from the upper to the lower spool, as seen in FIGURES 1 and 2, the upper roller 26 can turn freely in response to movement of the film thereover, but the lower roller is prevented from turning in the same direction. During operation of the camera, the lower spool, which then functions as the take-up spool, is driven by the camera to wind the film thereon and must be driven at a sufficient rate of speed to take up the film at the same rate it is fed past the shutter when there is relatively little film on the lower spool.

As the film tends to build up on the lower spool, it tends to take up the film at a higher rate than the film is advanced by the shutter mechanism and must slip to prevent accidental displacement of the film at the guiding means. In the present construction the spring 21 may be made relatively light, so that there will be minimum friction of the film in the guiding means, and the film is held against accidental displacement by the lower roller 25.

When the film is in the form of a relatively loose loop, as shown in solid lines in FIGURES 1 and 2, it can slide freely past the lower roller 25 even though this roller is not turning and will be wound on the lower spool 16. If the lower spool tends to wind the film too fast, the film will be drawn relatively tightly over the lower roller 25, as indicated by the dot-dash lines, and will be frictionally gripped by the lower roller. Since the lower roller cannot turn in a counter-clockwise direction, it will hold the film against being moved by the take-up spool, and will cause the take-up spool to slip without requiring a high drag on the film at the guiding means. As soon as the film feed mechanism on the camera has advanced the film further, it will again form a loose loop at the lower part of the magazine and will slip past the lower roller 25 to be taken up by the lower spool. When the magazine is reversed for exposing the other half of the film, the upper roller will become the lower roller and vice-versa, so that the operation will be the same in either direction of movement of the film.

Since the magazine of the present invention may be used with existing cameras whose slip clutches provided in the camera driving means are set to produce a relatively high torque, it is desirable to provide additional slip clutches in the magazine itself, which will slip in response to a lower and more nearly constant torque. For this purpose each of the spools 16, as best seen in FIGURE 5, is molded of a plastic material or the like, with an external cylindrical surface on which the film is wound, an integral internal tubular hub 31 to fit over the supporting pin in the magazine and which is smaller than the external wall to leave an annular space therebetween.

A driving spring 32, as best seen in FIGURE 4, is slipped over the hub and is provided with a driving projection 33 extending from one end of the spool to engage the usual driving means on the camera. The spring 32, as shown, is in the form of a strip of spring material bent into a substantially cylindrical shape to define a partially cylindrical spring which is split axially at one side. The driving projection 33 is at one side of the split and at the leading edge of the split relative to the direction in which the spool is driven. With this arrangement the driving force on the spring is a pushing force tending to unwind the spring from the hub, so that when the force exceeds a predetermined value for which the spring is designed, it will tend to release and slip on the hub. I have found that with this construction the driving force on the spool can be maintained substantially constant over a long period of time and regardless of variations in temperature, humidity and the like.

Figure 7:
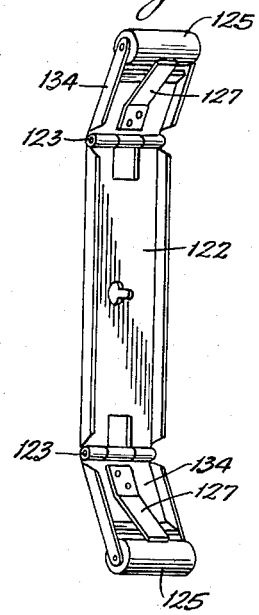
FIGURE 7 is a perspective view of the supporting plate and rollers of FIGURE 6.

The construction shown in FIGURES 6 and 7 is generally similar to that of FIGURES 1 to 5 and parts therein corresponding to like parts in FIGURES 1 to 5 are indicated by the same reference numerals plus 100. In this construction the supporting plate 122 is formed at its opposite ends with angular extensions 134 at the outer ends of which the rollers 125 are rotatably supported. The plate 122 is supported by fixed pins 123 fitting through loops formed at the juncture of the plate 122 and the extensions 134 as best seen in FIGURE 7. As shown, the extensions 134 are flanged, and the flanges project beyond the webs thereof to provide brackets in which the ends of the pins supporting the rollers 125 may be mounted. The springs 127 are in the form of flat spring strips riveted or otherwise secured to the webs of the extensions 134 with their free ends engaging the rollers 125 to hold them against rotation in one direction, while permitting free rotation in the opposite direction.

This construction functions in precisely the same manner as that of FIGURES 1 to 5 and enables the film to be held against accidental displacement by the take-up spool in either direction without requiring a high friction drag on the film at the film guiding means.

While two embodiments of the invention have been shown and described in detail, it will be understood that these are illustrative only and are not to be taken as a definition of the scope of the invention, reference being had for this purpose to the appended claims.

What is claimed is:

1. A film magazine for motion picture cameras comprising a casing having a lateral wall formed with an exposure aperture, film guiding means in the casing to guide a film past the exposure aperture, a pair of film spools in the casing on which film may be wound with the film between the spools passing through the film guiding means, a pair of friction rollers rotatably mounted in the casing adjacent to opposite ends of the film guiding means and over which the film passes between the guiding means and the spools respectively, and one-way acting means engaging the rollers to prevent rotation thereof by the film in a direction toward the adjacent spools respectively while permitting rotation thereof in the opposite direction.

2. A film magazine for motion picture cameras comprising a casing having a lateral wall formed with an exposure aperture, film guiding means in the casing to guide a film past the exposure aperture, a pair of film spools in the casing on which film may be wound with the film between the spools passing through the film guiding means, a pair of friction rollers rotatably mounted in the casing adjacent to opposite ends of the film guiding means and over which the film passes between the guiding means and the spools respectively, said rollers having yielding surfaces to engage the film, and spring fingers engaging the surfaces of the rollers to prevent rotation thereof by the film in a direction toward the adjacent spools while permitting rotation thereof in the opposite direction.

3. A film magazine for motion picture cameras comprising a casing having a lateral wall formed with an exposure aperture, film guiding means in the casing to guide a film past the exposure aperture, a pair of film spools in the casing on which film may be wound with the film between the spools passing through the film guiding means, a pair of friction rollers rotatably mounted in the casing adjacent to opposite ends of the film guiding means and over which the film passes between the guiding means and the spools respectively, said rollers having yielding surfaces to engage the film, and spring fingers secured to the casing and extending toward the rollers with their ends engaging the roller surfaces in planes at one side of the roller axes to prevent rotation of the rollers by the film in a direction toward the adjacent spools respectively while permitting rotation in the opposite direction.

4. A film magazine for motion picture cameras comprising a casing having a lateral wall formed with an exposure aperture, film guiding means in the casing to guide a film past the exposure aperture and including a back-up plate parallel to and spaced from said lateral wall, rollers carried by the back-up plate at the opposite ends thereof, a pair of film spools in the casing on which film may be wound with the film between the spools passing through the film guiding means and over the rollers, and one-way acting means carried by the back-up plate and engaging the rollers to prevent rotation thereof by the film toward the adjacent spools respectively while permitting free rotation thereof in the opposite direction.

5. A film magazine for motion picture cameras comprising a casing having a lateral wall formed with an exposure aperture, film guiding means in the casing to guide a film past the exposure aperture and including a back-up plate parallel to and spaced from said lateral wall, rollers carried by the back-up plate at the opposite ends thereof, a pair of film spools in the casing on which film may be wound with the film between the spools passing through the film guiding means and over the rollers, the rollers having yielding surfaces frictionally engaging the film, and spring fingers secured to the back-up plate and engaging the surfaces of the rollers to prevent rotation thereof by the film as the film moves toward the adjacent spools respectively.

References Cited in the file of this patent

UNITED STATES PATENTS

| | | |
|---|---|---|
| 2,008,110 | Scheibell | July 16, 1935 |
| 2,051,206 | Fairbanks | Aug. 18, 1936 |
| 2,105,629 | Becker | Jan. 18, 1938 |
| 2,119,375 | Wurm | May 31, 1938 |
| 2,159,998 | Morsbach et al. | May 30, 1939 |
| 2,163,179 | Porter | June 20, 1939 |
| 2,175,538 | Morsbach et al. | Oct. 10, 1939 |
| 2,184,003 | Parker et al. | Dec. 18, 1939 |
| 2,231,665 | Fairbanks | Feb. 11, 1941 |
| 2,233,389 | Kende et al. | Feb. 25, 1941 |
| 2,287,792 | Foster | June 30, 1942 |
| 2,431,254 | Jacobson | Nov. 18, 1947 |
| 2,560,564 | Foster et al. | July 17, 1951 |
| 2,719,013 | Babcock | Sept. 27, 1955 |